Figure 1:
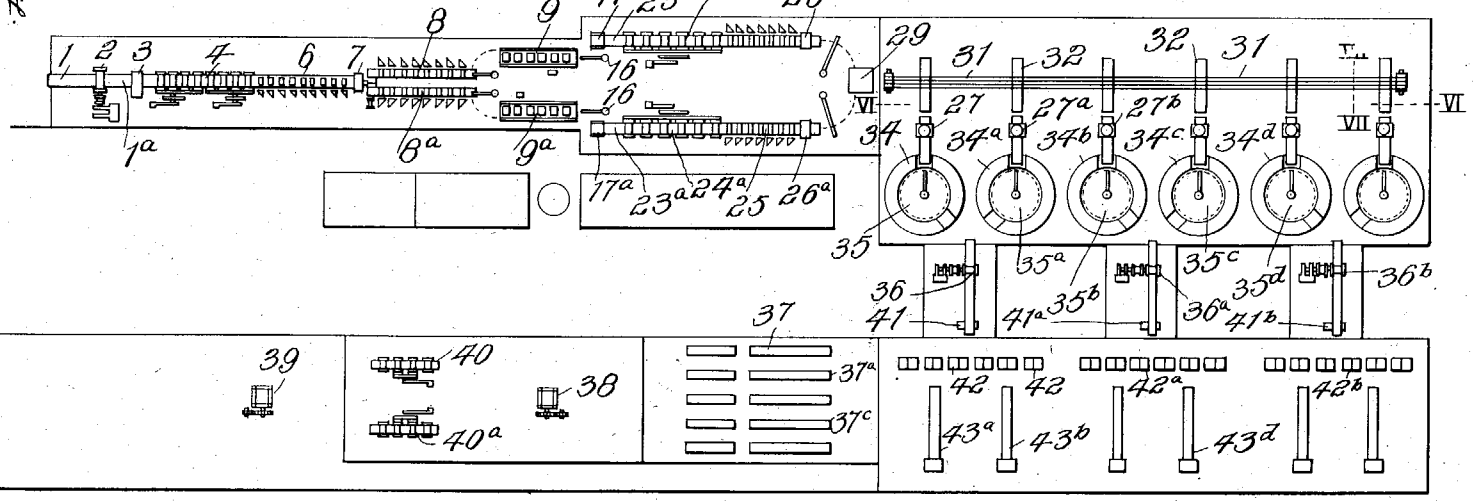

No. 11,896. Reissued Mar. 5, 1901.

R. G. WOOD.

MANUFACTURE OF SHEET METAL.

(Application filed Jan. 7, 1901.)

3 Sheets—Sheet 1.

WITNESSES:
Herbert Bradley.
F. E. Gaither

INVENTOR
Richard G. Wood
by Dennis S. Wolcott Att'y.

No. 11,896. Reissued Mar. 5, 1901.

R. G. WOOD.

MANUFACTURE OF SHEET METAL.

(Application filed Jan. 7, 1901.)

3 Sheets—Sheet 2.

WITNESSES:

Herbert Bradley

F. E. Gaither

INVENTOR

Richard G. Wood by Dennis S. Wolcott Att'y.

No. 11,896. Reissued Mar. 5, 1901.

R. G. WOOD.

MANUFACTURE OF SHEET METAL.

(Application filed Jan. 7, 1901.

3 Sheets—Sheet 3.

WITNESSES:
Herbert Bradley.
F. E. Gaither

INVENTOR
Richard G. Wood
by Dennis S. Wolcott Att'y.

UNITED STATES PATENT OFFICE.

RICHARD G. WOOD, OF ALLEGHENY, PENNSYLVANIA.

MANUFACTURE OF SHEET METAL.

SPECIFICATION forming part of Reissued Letters Patent No. 11,896, dated March 5, 1901.

Original No. 662,513, dated November 27, 1900. Application for reissue filed January 7, 1901. Serial No. 42,453.

*To all whom it may concern:*

Be it known that I, RICHARD G. WOOD, a citizen of the United States, residing at Allegheny, in the county of Allegheny and State of Pennsylvania, have invented or discovered certain new and useful Improvements in the Manufacture of Sheet Metal, of which improvements the following is a specification.

The invention described herein relates to certain improvements in the manufacture of sheet metal.

It has heretofore been the practice to reduce an ingot by rolling to flat bars about five-eighths to three-quarters of an inch in thickness. These bars are then cut into sections, known as "sheet-bars," of a length equal or approximately equal to the width of the sheets to be formed. These sheet-bars are then heated and fed edgewise one at a time between suitable rolls, whereby they are reduced to about a quarter or an eighth of an inch in thickness. Two sheets of this gage or thickness are then placed one upon the other and rolled down to about eighteen or twenty gage. These sheets are then separated, and a pile consisting of five or six sheets placed one upon the other is then formed and heated to a good rolling temperature, but below a welding temperature. The sheets composing the pack or pile are then reduced to the desired gage by rolling the pack between suitable sheet-rolls. All of the operations incident to the described method—such as feeding to the shears, piling the sheets, and charging the material at its different stages into the furnace or furnaces—are performed by hand, and the method therefore involves the expenditure of a great amount of labor and time.

This invention is based largely on what I believe to be a new method of sheet-rolling, the leading or essential characteristics of which are, first, the rolling of the metal always or uniformly in the same direction—that is, in the same line of feed—as distinguished from the method heretofore employed, wherein the direction or line of feed in respect of the sheet-bars was reversed—that is to say, the first direction of feed in breaking down or reducing the billet to sheet-bars being lengthwise, effecting longitudinal elongation, and the next direction or line of feed in breaking down the bars to sheets was sidewise or at right angles to the first direction or line of feed. To this end, second, at the beginning or first stages of the rolling operation and while the bloom ingot or billet is being reduced down to, say, a plate form or thickness one-quarter of an inch, more or less, I bring it to and thereby establish approximately the width of the finished sheet. Heretofore the width of the finished sheet was usually fixed or established by the shearing of the bar into sections forming sheet-bars, each of a length equal or approximately equal to the desired width of the finished sheet. Instead of this shearing to final width in my method I shear to a convenient piling and rolling length, and this is true of all shearing operations. In other words, my method differs from any previously known to me, among other things, in that I establish the width of the sheet in and by the preliminary rolling and not by shearing, as heretofore, and also in my improved method I am enabled thereby to always roll the material in the same line or direction of feed and to do it solely with reference to the element of elongation simultaneous with reduction, but without material spreading, and, further, in shearing the plate to convenient rolling lengths I am enabled at this stage in the operation to begin the formation of piles or packs consisting of two or more sections of plate arranged one upon the other. By the term "piling and rolling length" as herein employed is meant a length which will permit of two or more sections being placed one upon the other and passed simultaneously through reducing-rolls. This shearing of the plate into sections of a convenient rolling length corresponds to the shearing of a bar into sheet-bar sections in the old methods. The sheet-bars are cut to a length greater than their width, which is usually about six inches, more or less. Bars of such dimensions cannot be placed one upon the other and the pile thus formed passed between reducing-rolls unless the bars are welded together; but by cutting the plate into sections of lengths equal to or greater than their width two or more of the sections can be formed into a pile or pack and held in proper relation to each other while being reduced. In this way greater facility of operation is effected, a greatly-increased product is secured, and loss by waste in trimming is brought to a minimum. This system of operation also includes another element of advantage which I believe to be new in sheet-rolling. Where the width of the final sheet, as in previous methods of operation, has been fixed by shearing—that is, shearing the bar to lengths equal to the final width of sheet, say, generally, from twenty-four (24) to thirty-six (36) inches—the sheared sections are then fed into the rolls edgewise and are so narrow that hand feeding or manipulation, and generally one section at a time, must be resorted to. In other words, such sections cannot be handled in packs either by hand or machinery. In my improved method, width being already established, the plate can be cut much longer or to what are regarded as suitable rolling lengths—say from four to ten feet—and sections of such length and width (the latter being, say, from twenty-four to thirty-six inches) admit of piling and handling in further operations by suitable cranes and feed-tables mechanically driven and of course with a further large consequent reduction of the manual labor required in former methods. In fact, fully eighty per cent. of manual labor heretofore employed can be dispensed with, and as a further substantial advantage, as the sections and sheets so formed can be mechanically handled in piles of considerable size, the amount of product which can be worked at once can be increased in amount approximately ten or twenty times.

Another feature which I believe to be a substantial improvement in sheet-metal rolling relates to the manner of compacting together the sheets of each pile as preliminary to but a part of the rolling operation. After the sheets have been reduced to about No. 18 or No. 20 wire-gage, more or less, I propose to put them in packs of forty to sixty sheets, more or less, but as many as can be advantageously worked in that way. Such packs, even though somewhat previously compressed, will be loose when presented to the rolls. If the packs, with the sheets lying loosely one upon the other, be fed to rolls set at a proper distance apart to reduce the thickness of the pack, the top and bottom sheets will be pushed back from the pack. To overcome this tendency, the rolls are separated a distance somewhat greater than the thickness of the pack, run the pack preferably half through the rolls, tighten down the rolls with particular reference to compacting the pack rather than its reduction, and then run the pack forward and back one, two, or more times, this part of the operation being performed in a two-high reversing or three-high mill until the sheets of the pack are brought into such close contact with each other that their frictional engagement will when reducing-pressure is applied be sufficient to prevent the displacement referred to. The employment of comparatively-thick top and bottom plates in making up the pack will so far prevent loss of heat by radiation as to enable this compressing of the blocks to be effected without lessening or interfering with subsequent reduction.

Figure 2:
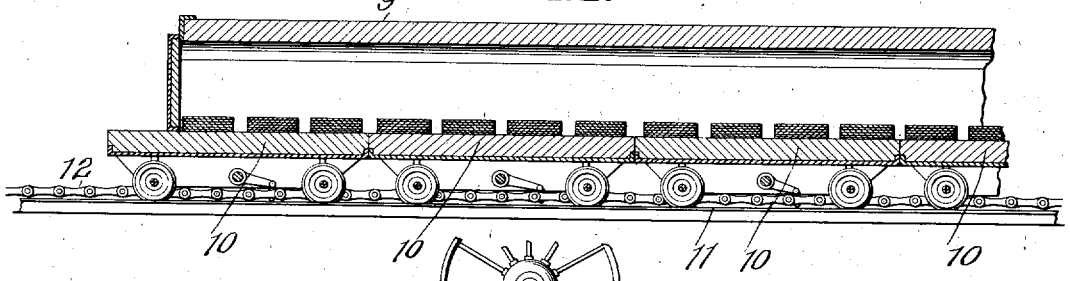
Figure 3:
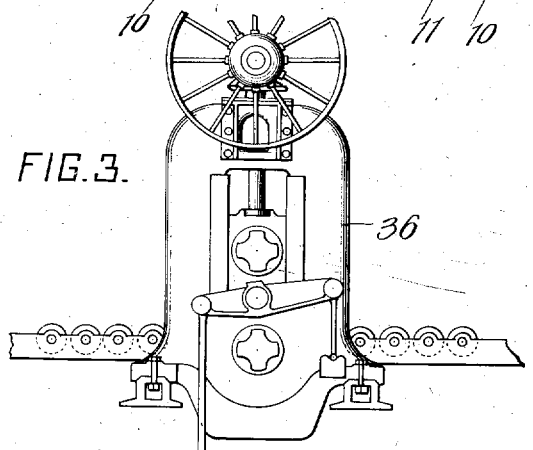
Figure 4:
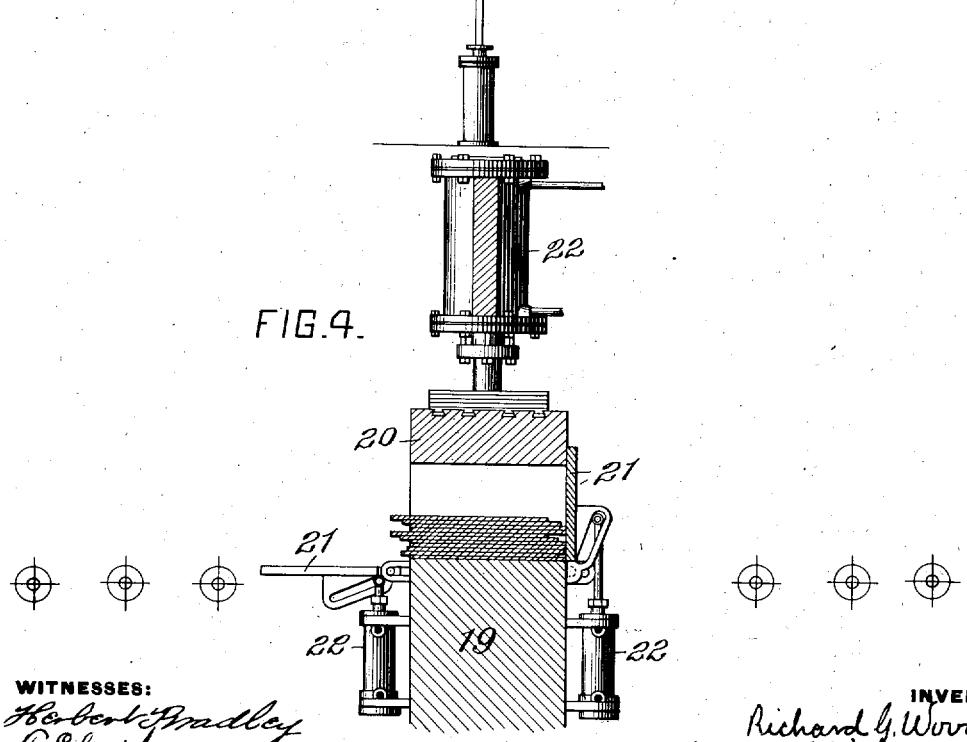
Figure 5:
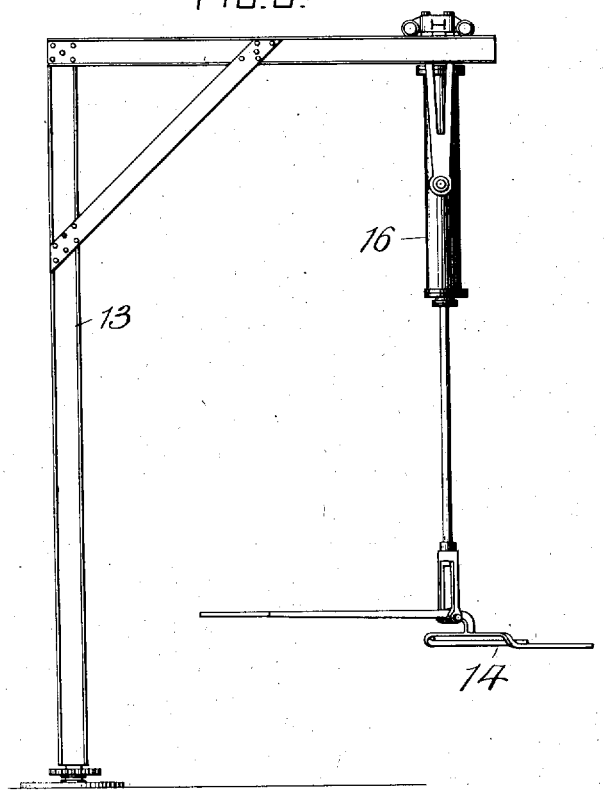
Figure 8:
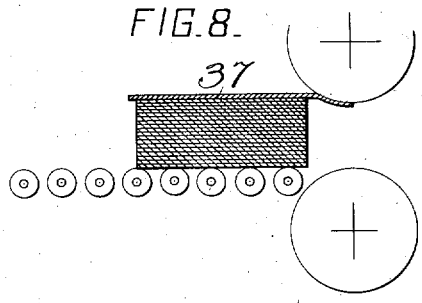
Figure 9:
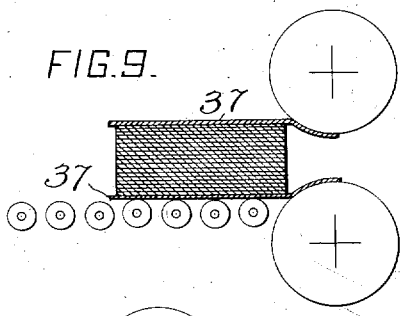
Figure 10:
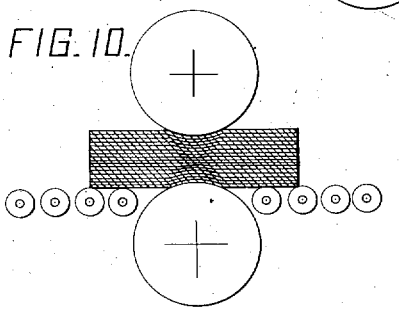
Figure 6:
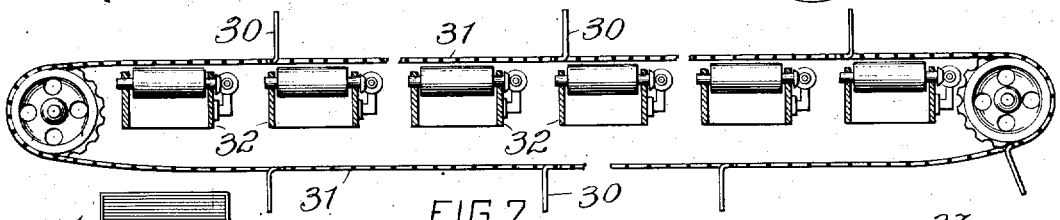
Figure 7:
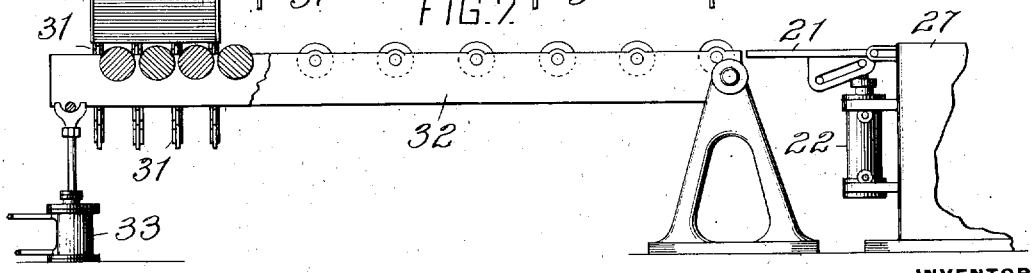

In the accompanying drawings, forming a part of this specification, Figure 1 is a diagrammatic view of my improved plant. Fig. 2 is a sectional elevation, on an enlarged scale, of the continuous-heating furnace. Fig. 3 is a side elevation of a three-high mill with feed-tables for feeding and receiving the packs or piles. Fig. 4 is a sectional elevation of a press for compacting and straightening the sheets when piled. Fig. 5 is an elevation of a transfer-crane having a carrying-fork. Fig. 6 is a view, partly in elevation and partly in section, of the feed mechanism for shifting the sheet packs or piles to the straightening-presses and furnaces, the plane of section being indicated by the line VI VI, Fig. 1. Fig. 7 is a sectional elevation of the same mechanism on a plane indicated by the line VII VII, Fig. 1. Figs. 8, 9, and 10 are views illustrating different methods of compacting the piles or packs preliminary to the rolling or reduction thereof.

In the practice of my invention the ingot is taken from the soaking-pit or heating-furnace and transferred to the front feed-table 1 of the blooming-mill 2, in which it is reduced by back-and-forth passes, in the manner well-known in the art, to a slab about two to four inches thick and having a width approximately equal to the width desired in the finished sheets. The slab is then fed by the rear feed-table 1ª or a prolongation thereof to the shear mechanism 3, which may be of any suitable or known construction, and thereby divided into sections of suitable length. These slab-sections are then fed in succession to the continuous mill 4, whereby they are elongated and reduced to plates of about one-quarter of an inch in thickness. There is no material widening of the material by this continuous mill nor in any of the subsequent reductions to which it is subjected. It will be observed that the reduction from the ingot to this point—*i. e.*, the end of the continuous mill, which corresponds to that point in the old method where doubling or the placing of sheets one upon the other begins—is effected without any reheating of the material, the several operations being effected with such rapidity that the material does not cool below a good rolling temperature. From the continuous mill 4 the plates are carried by the feed-table 6 to the shear mechanism 7, where they are divided into sections about four feet or of any other suitable piling and rolling length. As the production of the plant to this point is about double the capacity of the mechanism or apparatus employed in the further reduction and treatment of the material, it is preferred to employ duplicate or triplicate mechanisms in such further reduction. Hence two lines of feed-tables 8 8ª extend from the shear mechanism 7, the front ends of the feed-tables being arranged on opposite sides of the shear mechanism. As the sections are cut by the shears they are pushed laterally by any suitable construction of mechanism alternately or in any desired order onto the tables 8 8ª, by which they are fed to points near the charging ends of the furnaces 9 9ª. These furnaces are constructed in any suitable manner whereby the plates, arranged in piles, as hereinafter described, may be moved continuously through them. A convenient construction for this purpose consists in forming the bottoms in sections and independent of the other parts of the furnace, as shown in Fig. 2. These bottom-sections 10 are mounted on trucks, the wheels of which move along rails 11, extending a suitable distance beyond the ends of the furnaces. The trucks carrying the bottom-sections can be moved continuously or step by step through the furnace by any suitable means—as, for example, by endless chains 12—adapted to engage portions of the trucks. As it will be generally more advantageous to divide the plates as they come from the mill 4 into sections of suitable length, dependent upon the gage of sheet to be produced, it is preferred, in order to avoid excessively-long furnaces, to make the latter of a width slightly greater than the length of the plate-sections and to pass the piles of said sections laterally through the furnaces. Hence the sections must be turned horizontally through an arc of ninety degrees, as the material during the preceding steps has been moved endwise. A convenient means for effecting this shifting and turning of the plate-sections consists of cranes 13 13ª, located in convenient relation to the feed-tables 8 8ª and the furnaces 9 9ª. Forks 14 depend from the jibs of the cranes and are made vertically adjustable by the fluid-pressure cylinders 16, so that the forks can be lowered when in position in front of the feed-tables, thereby permitting of the lowering of the forks as the plate-sections are fed onto them, so that said sections will be superposed one upon the other. As soon as the desired number of plate-sections—say five or six, more or less—have been arranged in a pile, the crane is swung around and the pile placed transversely on the portion of one of the bottom-sections 10, projecting beyond the front end of the furnace, as shown in Fig. 2. As the plate-sections are fed endwise onto the shifting-forks the movement of the forks through an arc of ninety degrees to position over the bottom-section 10 will give the desired horizontal rotation to the pile, so that it may be moved laterally through the furnace. It will be understood that other forms of constructions of mechanical devices may be employed for piling the plates and transferring the piles to the furnaces. As a pile of properly-heated plate-sections passes out of the furnace it is raised from the projecting ends of the furnace-bottoms by forks similar to the forks 14, and similarly supported by cranes 16 16ª. These cranes are so located that the piles carried by the forks may be deposited by horizontal movements of the crane-jibs through arcs of ninety degrees upon feed-tables, whereby the piles are fed endwise into the bed-plates or anvils of the evening and compacting presses 17 17ª. As the plates may not be laid regularly one upon the other as they are fed onto the shifting-forks by the feed-tables 8 8ª and are also liable to be somewhat warped or twisted while being heated and handled, it is desirable that the plates in each pile should be arranged evenly and lie as flatly as possible one upon the other, to facilitate the reduction of the pile. To this end the presses are formed with bed-plates or anvils 19, and movable heads or platens 20, of approximately the same length and breadth as the plates forming the piles, so that the piles will be subjected to uniform pressures to insure the plates lying flat upon each other. A convenient means for evening consists of leaves 21, hinged to the anvil in such manner that when turned up by fluid-pressure cylinders 22 or other suitable means they will stand at right angles to the face of the anvil. In order to avoid folding the edges of the plates, the leaves, after being turned up, are given a straight inward movement, so as to strike fairly on the edges of the plates and bring them into the desired alinement. It will be understood that the leaves will be operated prior to the movable head or platen of the press and while the plates lie loosely on each other. After the plates in the piles have been evened up and straightened the piles are fed by the feed-tables 23 23ª to the continuous mills 24 24ª, consisting of a series of pairs of rolls so constructed and adjusted relative to each other in accordance with rules well known in the art as to effect a reduction of the plates composing the piles to sheets of, or approximately of, eighteen or twenty gage. During this reduction there will not be any material widening of the plates or sheets, but there will be such an elongation as to render it desirable to divide the piles or sheets composing the piles into sections of suitable length, dependent upon the gage required in the finished sheets. To this end suitable shear mechanism 26 26ª are arranged at the rear ends of the feed-tables 25 25ª, which receive the piles from the last pair of rolls of the continuous mills 24 24ª. After the piles have been sheared into sections, as stated, the sheets composing such pile-sections are separated from each other and rearranged in piles consisting of thirty, forty, fifty, or more sheets. These newly-formed sheet piles are then transferred to one or the other of the evening and straightening presses 27 27ª, &c., which may be of any suitable construction, such, for example, as that shown in Fig. 4. A convenient means for transferring the sheet pile to the presses 27 27ª, &c., consists of a feed mechanism extending along in front of the presses, which are preferably arranged in line with each other, as shown in Fig. 1. The piles are formed on a table 29, located at the front end of the feed mechanism and pushed onto the latter as soon as formed. The piles are shifted along by means of fingers 30, carried by the endless chains 31, as shown in Figs. 6 and 7. In order to transfer the piles from the chains or feed mechanism onto the anvils of the presses, feed-tables 32, having driven rollers, are arranged across the feed mechanism at points in line with the presses. The ends of the tables adjacent to the presses are pivotally supported, and their outer ends are adapted to be shifted vertically by fluid-pressure cylinders 33. Normally the feed-tables are lowered, so that the upper surfaces of their rollers will be on a level with or slightly below the paths of movement of the chains. When it is desired to shift one of the piles to a press, the feed-rollers are raised when a pile is moved into line therewith, so that the rotating rollers will lift the pile from the chains and shift it onto the anvil of the press. The feed-table is then lowered, so as to permit the endless chains to move piles into line with other presses. The sheets should be so piled on the table 29 that the piles will be moved laterally by the chains and endwise by the feed-tables into the presses. After the sheets have been evened up and straightened by the presses the piles are removed and charged into the furnaces 34 34ª, &c., by cranes 35 35ª, &c. As shown in Fig. 1, the furnaces are made circular, with inside charging-openings, so that each furnace, which is constructed to receive a number of piles, may be served by one crane located in the center of the circle. These cranes are preferably constructed similar to the cranes 13 and 16, heretofore described. As soon as the sheet piles have been properly heated they are removed from the furnaces by the cranes 35 35ª, &c., and placed upon the front feed-tables of the mills 36 36ª, &c. These mills may be of any suitable type, but preferably either of the three-high type, as shown in Fig. 3, or of the well-known two-high reversing type, the rolls of such mills being suitably constructed for rolling sheets. As the piles may be opened up during the heating thereof, thereby rendering it possible for some of the upper sheets to be dislodged when the piles are fed to the rolls for the first pass, the piles or at least a portion thereof should be compressed before being fed to the rolls for reduction, so that the sheets will remain in position in the piles when the latter are fed to the rolls for reduction. To this end protecting or cap plates 37 may be placed on the upper side or on the upper and lower sides of the piles, as shown in Figs. 8 and 9. These plates are made somewhat longer than the piles and have their front or entering ends curved inwardly to such an extent that the distance between the cap-plates and the bottoms of the piles at the entering end will not exceed and preferably will be somewhat less than the distance between the rolls. By this means wedge-like entering-points are provided for the piles and the front ends of the sheets are gradually forced together without crowding any of the sheets off of the piles. As the sheets are usually so tightly pressed together in the first pass that they will adhere to each other, there is little liability of the upper or outer sheets being dislodged in subsequent passes and the cap-plates may therefore be dispensed with. However, as these cap plates are thicker than the sheets, and therefore will cool more slowly than the sheets, (the cap-plates being placed on the piles prior to their being heated,) they may be advantageously retained during the entire reduction of the piles in the mills 36 36ª, &c. As the sheets will be generally caused to so adhere to each other by the compression effected in the first pass as to render a dislodgment of any of the sheets in subsequent passes improbable, such compression of the piles may be effected by separating the rolls sufficiently to permit the piles being fed in between the rolls without any reduction until the piles are about half-way through the rolls. The upper roll is then forced down by its adjusting mechanism to obtain the desired bite or compression on the piles and the rolls rotated, thereby compressing and reducing the piles from the middle to one end, as shown in Fig. 10. The piles are then fed back through the rolls, thereby reducing and compressing the other ends of the piles. By subsequent back-and-forth passes through the mills 36 36ª, &c., the sheets are reduced to or approximately to twenty-six or twenty-eight gage. Comparatively thick top and bottom plates may be advantageously employed when compacting and reducing the piles in the manner shown in Fig. 10. If no further reduction is required, the piles or packs are passed through the annealing-furnaces 37 37ª, &c., and thence to the shears 38, where the piles are cut into sections of length equal or approximately equal to the desired length of the finished sheets. The piles are then opened up or the sheets separated from each other, and if no further working is desired are passed to the trimming-shears 39, where the sheets are cut to the required length and breadth.

If the sheets are to be cold rolled or finished, they are after being separated from each other, as stated, pickled and otherwise treated in the manner well known in the art and then passed singly or in piles through the cold-rolls 40 and then trimmed by the shears 39.

If sheets of a gage lighter than that produced by the rolls 36 are desired, the piles as they come from the rolls 36 are sheared into sections of suitable length by shear mechanisms 41 41ª, &c. The sheets of the pile-sections are separated, rearranged in piles of fifty, sixty, or seventy sheets, more or less, evened and compressed, as heretofore described, and charged into heating-furnaces 42 42ª, &c. After being heated the piles are reduced in mills 43 43ª, similar to the mills 36, and in the manner described in connection with said mills. After being reduced in the mills 43 the piles or sheets are annealed and otherwise treated as heretofore described.

Among the many novel characteristics of my improved method attention is especially called to the fact that the piling and consequent simultaneous reduction are begun much earlier and while the material is much thicker than in the old method in which the sheet-bars are broken down to or approximately to eighteen-gage before piling is commenced. In my method piling is commenced while the plate has approximately the thickness of the sheet-bars.

While I have described with some particularity mechanisms for effecting the several steps of my improved method of manufacturing sheets, other mechanisms which will readily suggest themselves to those skilled in the art may be employed. Hence the invention set forth herein is not limited to the use of any particular forms or constructions of mechanisms employed.

I claim herein as my invention—

1. As an improvement in the art of rolling metal sheets without changing the direction of feed, the method described herein, which consists in reducing an ingot by rolling without reheating into a plate or bar of a width approximately equal to the width desired in the finished sheets and shearing such bar or plate into sections of suitable length for piling and further rolling in the same direction, substantially as set forth.

2. As an improvement in the art of rolling metal sheets without changing the direction of feed, the method herein described which, starting with sections of a bar or plate of a width equal or approximately equal to the width desired in the finished sheet and of suitable piling and rolling lengths, consists in arranging the sections in piles, heating the piles, and then rolling the piles lengthwise in the original or first direction of feed, to reduce the thickness of the plates composing the piles without materially increasing the width of the sheets, substantially as set forth.

3. As an improvement in the art of rolling metal sheets without changing the direction of feed, the method herein described, which consists in reducing an ingot by rolling into a bar or plate of a width approximately equal to the width desired in the finished sheet, shearing such bar or plate in sections of suitable piling and rolling length, arranging the sections in piles, heating the piles and then rolling the piles lengthwise to reduce the thickness of the plates composing the piles without materially increasing the widths of the sheets, substantially as set forth.

4. As an improvement in the art of rolling metal sheets, without changing the direction of feed, the method herein described which, starting with a bar or plate of a width approximately equal to the width desired in the finished sheet, consists in shearing such plate or bar in sections of suitable piling and rolling length, arranging the sections in piles, heating the piles, and then rolling the piles lengthwise in the original or first direction of feed to reduce the thickness of the plates composing the piles without materially increasing the width of the sheets, substantially as set forth.

5. As an improvement in the art of rolling metal sheets without changing the direction of feed, the method herein described, which consists in reducing an ingot by rolling into a bar or plate of a width approximately equal to the width desired in the finished sheet, shearing such bar or plate in sections of suitable piling and rolling length, arranging the sections in piles, heating the piles, then rolling the piles lengthwise to reduce the thickness of the plates composing the piles without materially increasing the widths of the sheets, shearing the piles into sections of suitable rolling length, opening up the sections, arranging the sheets in piles, heating the piles and then rolling lengthwise the piles to reduce the sheets in thickness without materially increasing the widths of the sheets, substantially as set forth.

6. As an improvement in the art of rolling metal sheets, the method herein described which, starting with the bar-plate of a width approximately equal to the width desired in the finished sheet, consists in shearing such bar-plate in sections of suitable piling and rolling length, arranging the sections in piles, heating the piles, then rolling the piles lengthwise to reduce the thickness of the plates composing the piles without materially increasing the widths of the sheets, shearing the piles into sections of suitable rolling length, opening up the sections, arranging the sheets in piles, heating the piles and then rolling lengthwise the piles to reduce the sheets in thickness without materially increasing the widths of the sheets, substantially as set forth.

7. As an improvement in the art of rolling metal sheets without changing the direction of feed, the method herein described which, starting with sections of a bar or plate of a width equal or approximately equal to the width desired in the finished sheet and of suitable piling and rolling lengths, consists in arranging the sections in piles, heating the piles, then rolling the piles lengthwise to reduce the thickness of the plates composing the piles without materially increasing the width of the sheets, shearing the piles into sections of suitable rolling length, opening up the sections, arranging the sheets in piles, heating the piles, and then rolling the piles lengthwise to reduce the sheets in thickness without materially increasing the widths of the sheets, substantially as set forth.

8. As a step in the manufacture of sheet metal in piles, the method of preventing displacement during rolling of the sheets composing the pile, which consists in effecting a preliminary compression of a portion of the piles prior to subjecting the packs to a reducing action, substantially as set forth.

9. As a step in the manufacture of sheet metal in piles, the method of preventing displacement during rolling, of the sheets composing the piles, which consists in effecting a preliminary compression of a portion of the pile prior to the entrance of the piles between the rolls when set for effecting a reducing-pressure, substantially as set forth.

10. As a step in the manufacture of sheet metal in packs, the method of preventing displacement of the sheets by inserting the pack between the opened reducing-rolls, screwing the rolls down onto the pack and compressing the sheets on each other from a line of bite intermediate of the ends of the pack to such ends, preliminary to the application of a reducing-pressure, substantially as set forth.

In testimony whereof I have hereunto set my hand.

RICHARD G. WOOD.

Witnesses:
DARWIN S. WOLCOTT,
F. E. GAITHER.